(12) United States Patent
Chen et al.

(10) Patent No.: US 10,810,160 B2
(45) Date of Patent: Oct. 20, 2020

(54) AUTOMATED HARDWARE DEVICE STORAGE TIERING

(71) Applicant: INTERNATIONAL BUSINESS MACHINES CORPORATION, Armonk, NY (US)

(72) Inventors: Dong Chen, Beijing (CN); Ling Chen, Beijing (CN); Jie Peng, Beijing (CN); Li Ni Zhang, Beijing (CN); Min Min Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 15/617,081

(22) Filed: Jun. 8, 2017

(65) Prior Publication Data

US 2018/0357228 A1 Dec. 13, 2018

(51) Int. Cl.
*G06F 16/16* (2019.01)
*G06F 3/06* (2006.01)
*G06F 12/00* (2006.01)

(52) U.S. Cl.
CPC .......... *G06F 16/164* (2019.01); *G06F 3/061* (2013.01); *G06F 3/0605* (2013.01); *G06F 3/0632* (2013.01); *G06F 3/0685* (2013.01); *G06F 12/00* (2013.01)

(58) Field of Classification Search
CPC .................................................. G06F 16/164
See application file for complete search history.

(56) References Cited

U.S. PATENT DOCUMENTS

| | | | |
|---|---|---|---|
| 8,429,346 B1* | 4/2013 | Chen | G06F 3/0613 709/213 |
| 9,323,682 B1 | 4/2016 | Marshak et al. | |
| 10,116,732 B1* | 10/2018 | Canton | H04L 41/0813 |
| 2013/0159359 A1* | 6/2013 | Kumar | G06F 3/0605 707/822 |
| 2014/0122867 A1* | 5/2014 | Shrinivasan | H04L 63/0428 713/155 |
| 2014/0351515 A1 | 11/2014 | Chiu et al. | |
| 2015/0039837 A1 | 2/2015 | Quan et al. | |
| 2016/0162588 A1* | 6/2016 | Tuchman | G06F 16/3344 707/722 |

\* cited by examiner

*Primary Examiner* — Dawaune A Conyers
(74) *Attorney, Agent, or Firm* — Schmeiser, Olsen & Watts; Mark C. Vallone

(57) ABSTRACT

A method and system for improving a data storage system is provided. The method includes extracting original data storage attributes from metadata comprised by data for storage within a hardware storage system. Additional data storage attributes associated with current storage requirements of the data are retrieved and merged with the original data storage attributes resulting in a group of combined data storage attributes. An attribute matrix categorizing attribute types each attribute is generated. A digital tag defining the attribute matrix is generated and attached to the metadata. Data storage tier definitions and associated tier attributes are received and associated with the digital tag. Resulting specified tiers of the hardware storage system a defined for storage of specified portions of the data and each portion of data is stored within an associated tier.

16 Claims, 8 Drawing Sheets

| ATTRIBUTE TYPE | ATTRIBUTE VALUE |
|---|---|
| ACCESSIBILITY | HIGH FREQUENCY |
| | MEDIUM FREQUENCY |
| | LOW FREQUENCY |
| DATA TYPE | FLAT FILE |
| | STREAM MEDIA |
| | BUSINESS RECORD |
| | DATABASE TRANSACTION |
| DATA I/O TYPE | DIRECT I/O |
| | BUFFERED I/O |
| DATA ENCRYPTION | TRUE |
| | FALSE |

FIG. 2

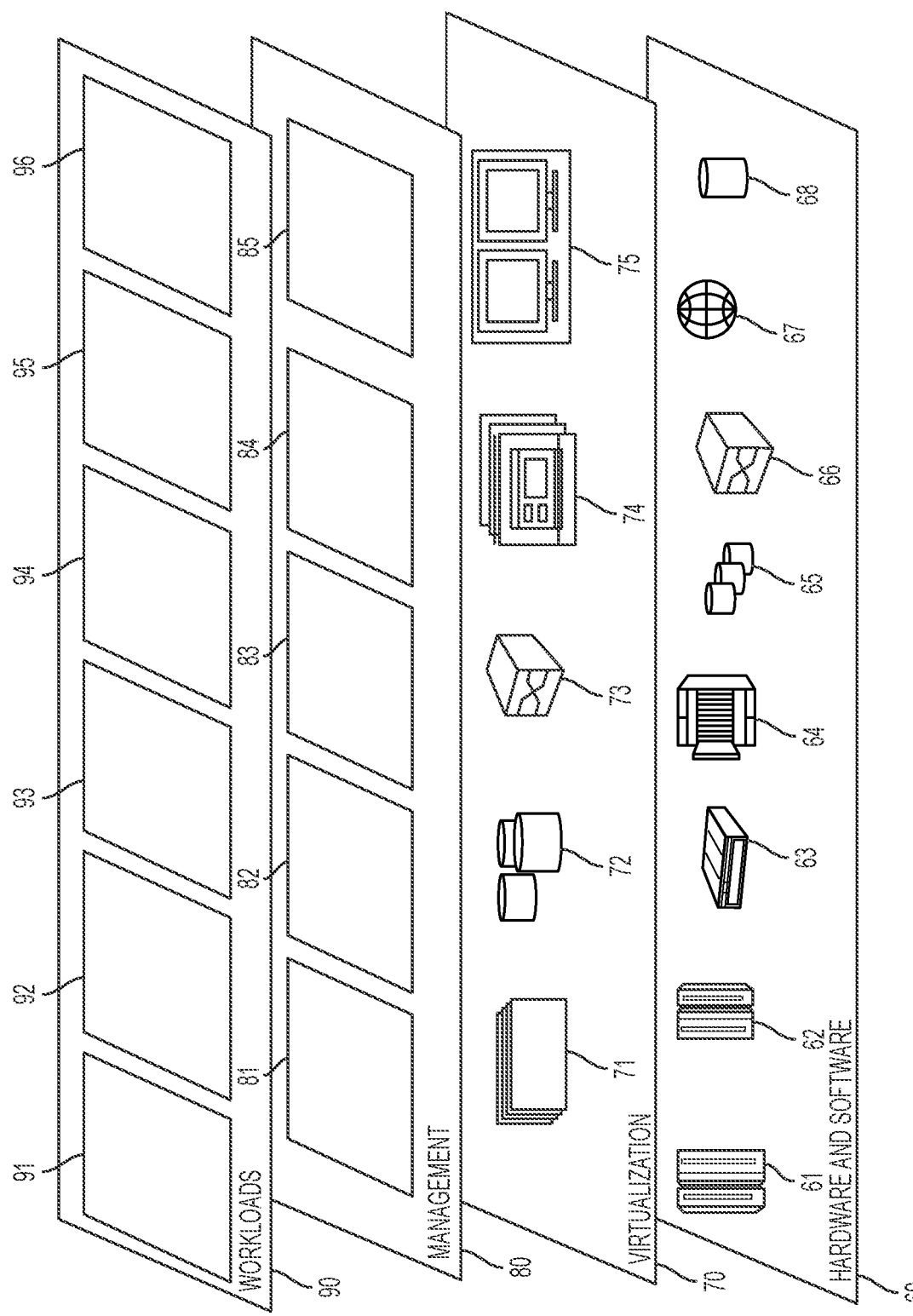

AUTOMATED HARDWARE DEVICE STORAGE TIERING

FIELD

The present invention relates generally to a method for determining tiers for hardware device storage and in particular to a method and associated system for improving hardware device storage technology via generation of digital tags for automated tier generation associated with a hardware storage system.

BACKGROUND

Accurately determining storage options for a device typically includes an inaccurate process with little flexibility. Determining storage system solutions with respect to efficiency may include a complicated process that may be time consuming and require a large amount of resources. Accordingly, there exists a need in the art to overcome at least some of the deficiencies and limitations described herein above.

SUMMARY

A first aspect of the invention provides a data storage system improvement method comprising: extracting, by a processor of controller hardware device for a hardware storage system, original data storage attributes from metadata comprised by data for storage within the hardware storage system; retrieving, by the processor, additional data storage attributes associated with current storage requirements of the data; merging, by the processor, the original data storage attributes with the additional data storage attributes resulting in a group of combined data storage attributes; generating, by the processor, an attribute matrix categorizing attribute types with respect to attribute values for each attribute of the group of combined data storage attributes; generating, by the processor, a digital tag defining the attribute matrix; attaching, by the processor, the digital tag to the metadata; receiving, by the processor, data storage tier definitions and associated tier attributes; associating, by the processor, the digital tag with the data storage tier definitions and associated tier attributes; determining, by the processor based on results of the associating, specified tiers of the hardware storage system for storage of specified portions of the data; and storing, by the processor, each portion of the specified portions of the data within an associated tier of the specified tiers of the hardware storage system.

A second aspect of the invention provides a controller hardware device of hardware storage system comprising a processor coupled to a computer-readable memory unit, the memory unit comprising instructions that when executed by the computer processor implements a data storage system improvement method comprising: extracting, by the processor, original data storage attributes from metadata comprised by data for storage within the hardware storage system; retrieving, by the processor, additional data storage attributes associated with current storage requirements of the data; merging, by the processor, the original data storage attributes with the additional data storage attributes resulting in a group of combined data storage attributes; generating, by the processor, an attribute matrix categorizing attribute types with respect to attribute values for each attribute of the group of combined data storage attributes; generating, by the processor, a digital tag defining the attribute matrix; attaching, by the processor, the digital tag to the metadata; receiving, by the processor, data storage tier definitions and associated tier attributes; associating, by the processor, the digital tag with the data storage tier definitions and associated tier attributes; determining, by the processor based on results of the associating, specified tiers of the hardware storage system for storage of specified portions of the data; and storing, by the processor, each portion of the specified portions of the data within an associated tier of the specified tiers of the hardware storage system.

A third aspect of the invention provides a computer program product, comprising a computer readable hardware storage device storing a computer readable program code, the computer readable program code comprising an algorithm that when executed by a processor of a controller hardware device of a hardware storage system implements a data storage system improvement method, the method comprising: extracting, by the processor, original data storage attributes from metadata comprised by data for storage within the hardware storage system; retrieving, by the processor, additional data storage attributes associated with current storage requirements of the data; merging, by the processor, the original data storage attributes with the additional data storage attributes resulting in a group of combined data storage attributes; generating, by the processor, an attribute matrix categorizing attribute types with respect to attribute values for each attribute of the group of combined data storage attributes; generating, by the processor, a digital tag defining the attribute matrix; attaching, by the processor, the digital tag to the metadata; receiving, by the processor, data storage tier definitions and associated tier attributes; associating, by the processor, the digital tag with the data storage tier definitions and associated tier attributes; determining, by the processor based on results of the associating, specified tiers of the hardware storage system for storage of specified portions of the data; and storing, by the processor, each portion of the specified portions of the data within an associated tier of the specified tiers of the hardware storage system.

The present invention advantageously provides a simple method and associated system capable of accurately determining storage options.

BRIEF DESCRIPTION OF THE DRAWINGS

FIG. 2 illustrates a value matrix executed by the system of FIG. 1, in accordance with embodiments of the present invention.

FIG. 8 illustrates a set of functional abstraction layers provided by cloud computing environment, in accordance with embodiments of the present invention.

DETAILED DESCRIPTION

Figure 1:
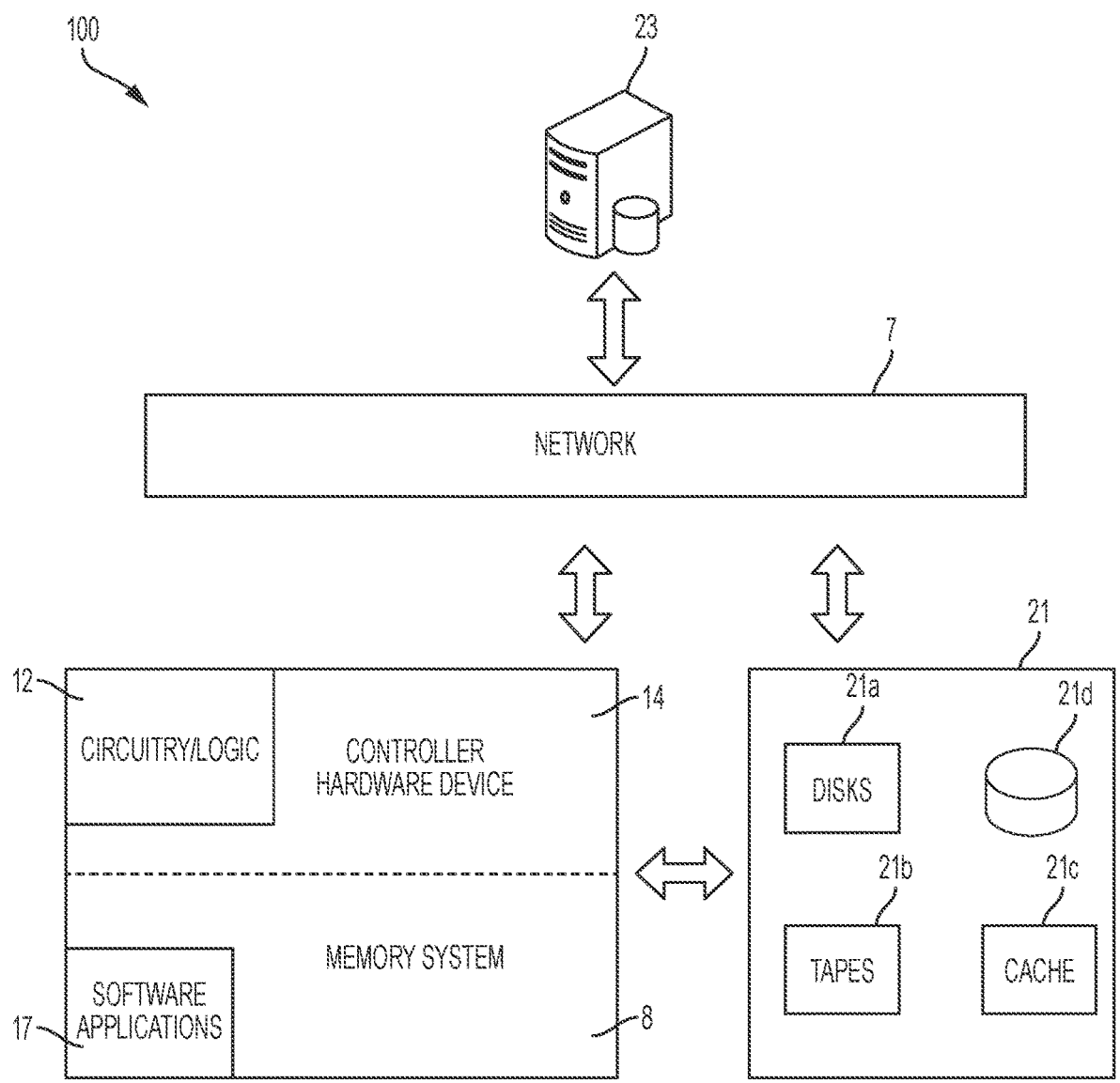
FIG. 1 illustrates a system for improving remote storage system efficiency via usage of automated storage device tiering, in accordance with embodiments of the present invention.

FIG. 1 illustrates a system 100 for improving remote storage system efficiency via usage of automated storage device tiering, in accordance with embodiments of the present invention. System 100 is enabled to automatically add data storage attribute tags to associated metadata for enabling remote storage. The attribute tags are associated with attributes including, inter alia, storage system accessibility, storage system data type, storage system I/O Type, storage system archival properties, encryption property etc. The attributes are executed for improving a remote storage auto-tiering process. System 100 allows remote media to be classified into different storage tiers (of a storage device) based on characteristics of different storage media. For example, an SSD device may be associated with high performance storage and an SATA disk may provide high capacity storage. In response, portions of data for storage are mapped to different storage tiers of a device thereby improving an efficiency of a memory system. System 100 enables a mechanism to automatically generate tier of a memory device with respect to a data value matrix. The data value matrix is associated with multiple attributes of data, such as a data type, a data accessibility, data encryption, etc. The data value matrix comprises an input for the data auto-tiering process for storing data within an applicable storage device associated with a cloud. System 100 enables a process for automatically generating memory device tiers with respect to a data value matrix by:
1. Enabling differing data attribute types and values within the data value matrix to verify differing requirements for data storage.
2. Combining a data attribute (digital) tag with metadata (of the data for storage within a cloud) such that the data attribute tag is facilitated in an auto-tiering solution.
3. Inputting the data value matrix serves into the data auto-tiering solution for correlating the data to an associated storage device tier.

System 100 of FIG. 1 includes a server 23 connected through a network 7 to a controller hardware device 14 and a (hardware) storage system 21 (e.g., associated with remote cloud storage). Controller hardware device 14 is connected to storage system 21. Storage system 21 comprises a plurality of differing hardware storage devices including, inter alia, disk drives 21a, magnetic tapes 21b, cache memory 21c, database storage 21d, etc. Controller hardware device 14 comprises (specialized) circuitry/logic 12 and a memory system 8 comprising software application 17. Controller hardware device 14 is configured to execute the circuitry/logic 12 and software applications 17 for controlling all functionality of storage system for improving remote storage system efficiency via automated storage device tiering with respect to disk drives 21a, magnetic tapes 21b, cache memory 21c, and database storage 21d. Server 23 comprises data for tiered storage within storage system 21. Controller hardware device 14 and storage system 21 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, controller hardware device 14 and storage system 21 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-8. The specialized discrete non-generic analog, digital, and logic based circuitry (e.g., circuitry/logic 12, etc.) may include proprietary specially designed components (e.g., a specialized integrated circuit, such as for example an Application Specific Integrated Circuit (ASIC) designed for only implementing an automated process for improving remote storage system efficiency via usage of automated storage device tiering. Controller hardware device 14 includes memory system 8 comprising software applications 17. The memory system 8 may include a single memory system. Alternatively, the memory system 8 may include a plurality of memory systems. Network 7 may include any type of network including, inter alia, a local area network, (LAN), a wide area network (WAN), the Internet, a wireless network, etc.

System 100 is enabled to build a database from different volumes within cloud. Each volume is generated via a different storage media (i.e. SSD, SAS, SATA, etc.) classified to different storage tiers. When data is stored within a cloud comprising enabled auto-tiering software, the data is moved transparently across different storage tiers based on data access frequency. System 100 combines a digital tag with a value matrix with respect to data stored within a Cloud. The digital tag and value matrix are enabled within a data auto-tiering solution process to illustrate key indications with respect to categorizing the data into differing storage tiers thereby improving a data auto-tiering process such that multiple dimensions are defined within a value matrix as data attributes, sample attributes (i.e., accessibility, data type, I/O type, archival property, encryption property, etc. The data attributes defined in the value matrix arte executed within the data auto-tiering solution. The defined data attributes are associated to differing storage device tiers. Therefore, system 100 enables an advantageous process for:
1. Introducing a digital tag (for a value matrix) to meta-data for data stored in cloud thereby facilitating a data storage device auto-tiering solution for improving the focus of an auto-tiering solution process from one dimension (access frequency) to multiple dimensions defined in a value matrix as data attributes.
2. Defining data attributes in a value matrix provided by a cloud administrator that is easily changeable and expandable due to varying types of data.

FIG. 2 illustrates a value matrix 200 executed by system 100 of FIG. 1, in accordance with embodiments of the present invention. (Data) value matrix 200 summarizes key data attributes for leveraging in a data auto-tiering solution. The data attributes are enabled to determine storage layers for storing portions of the data. For example, a data attribute of "Data Type" may comprise a type: "Flat File" for storage in a storage tier generated from a cluster file system thereby maximizing storage utilization. Likewise, a data attribute type: "Database Transaction" may be stored in a storage tier built from a raw disk thereby enhancing a performance of a storage system. Value matrix 200 may be modified or improved based on different requirements. Value matrix 200 comprises attribute types 202 (e.g., accessibility, data type, etc.) and attribute values 204 (e.g., high frequency, flat file, etc.).

Figure 3:
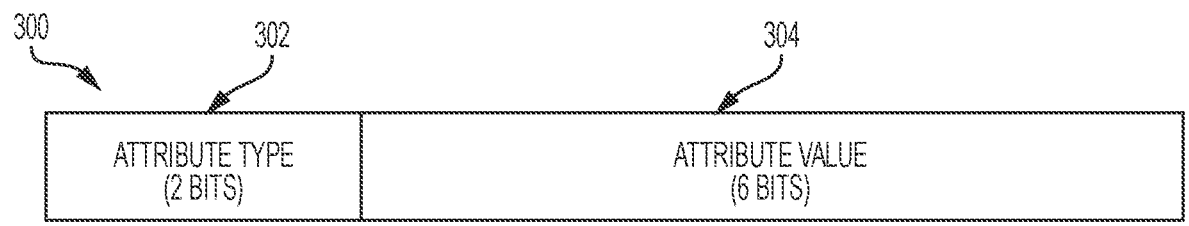
FIG. 3 illustrates a digital data attribute tag, in accordance with embodiments of the present invention.

FIG. 3 illustrates a digital data attribute tag 300, in accordance with embodiments of the present invention. Digital data attribute tag 300 comprises an attribute type portion 302 and an attribute value portion 304 (i.e., comprising differing bit sizes) and is defined within metadata of data for storage. A portion digital data attribute tag 300 is added to the metadata. The metadata typically indicates a common property of all types of data and provides information associated with one or more aspects of the data.

Figure 4:
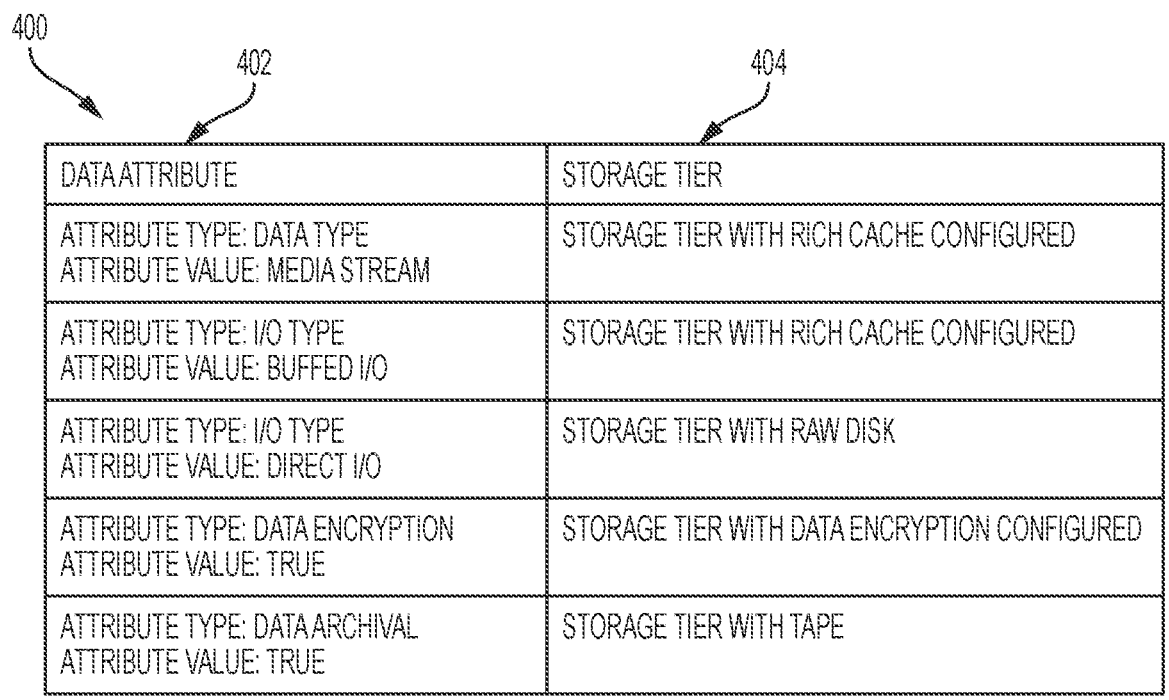
FIG. 4 illustrates a matrix for associating a data attribute 402 to a storage tier 404, in accordance with embodiments of the present invention.

FIG. 4 illustrates a matrix for associating a data attribute 402 to a storage tier 404, in accordance with embodiments of the present invention. A data attribute type and attribute value may be associated to a specific predefined storage tier. For example, a data attribute type marked as "I/O type" and an attribute value marked as "Buffered I/O" may be associated with a storage tier assigned as rich cache space. Likewise, a data attribute type marked as "Direct I/O" may be associated to a storage tier assigned as a raw disk to avoid using any cache memory.

Figure 5:
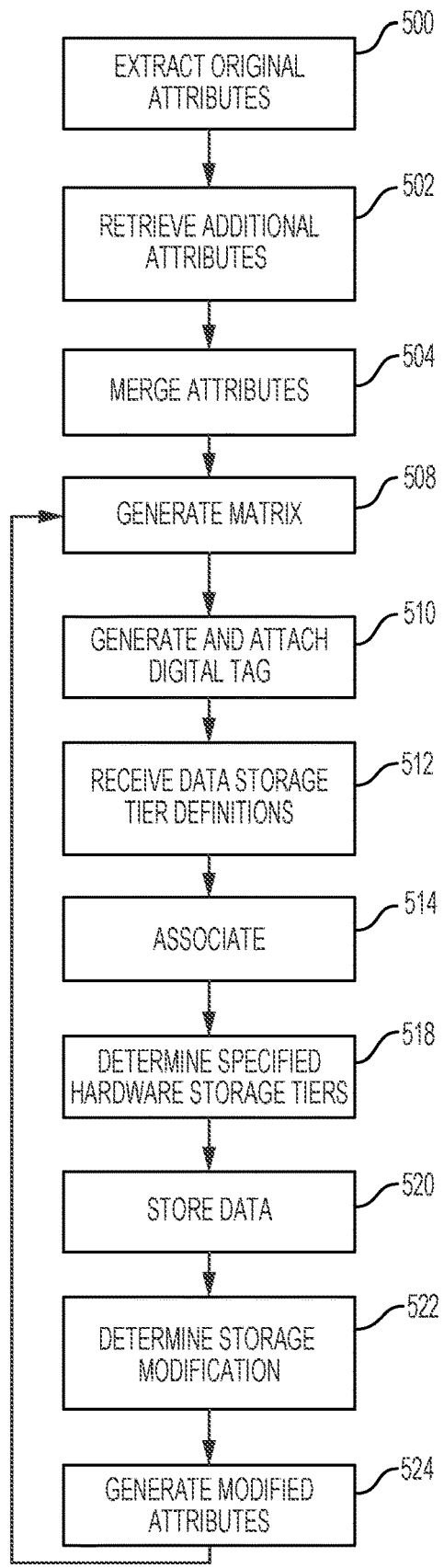
FIG. 5 illustrates an algorithm detailing a process flow enabled by the system of FIG. 1 for improving remote storage system efficiency via usage of automated storage device tiering, in accordance with embodiments of the present invention.

FIG. 5 illustrates an algorithm detailing a process flow enabled by system 100 of FIG. 1 for improving remote storage system efficiency via usage of automated storage device tiering, in accordance with embodiments of the present invention. Each of the steps in the algorithm of FIG. 5 may be enabled and executed in any order by a computer processor(s) executing computer code. Additionally, each of the steps in the algorithm of FIG. 5 may be enabled and executed in combination by server 23, storage system 21 (e.g., a cloud storage system), and/or controller hardware device 14 of FIG. 1. In step 500, original data storage attributes are extracted (by a hardware storage controller device) from metadata comprised by data for storage within a hardware storage system. The hardware storage system may include, inter alia, SSD disks, SAS disks, SATA disks, magnetic tape, etc. In step 502, additional data storage attributes associated with current storage requirements of the data are retrieved. In step 504, the original data storage attributes are merged with the additional data storage attributes resulting in a group of combined data storage attributes. In step 508, an attribute matrix is generated. The attribute matrix categorizes attribute types with respect to attribute values for each attribute of the group of combined data storage attributes. Attribute types may include, inter alia, data accessibility types, data types, data input/output types, data encryption types, etc. Attribute values may include, inter alia, data storage frequency values, data file types, buffered or direct input/outputs, data encryption properties, etc. In step 510, a digital tag defining the attribute matrix is generated and attached to the metadata. The digital tag may include an 8 bit tag comprising an attribute type section and an attribute value section. In step 512, data storage tier definitions and associated tier attributes are received. In step 514, the digital tag is associated with the data storage tier definitions and associated tier attributes. In step 518, specified tiers of the hardware storage system (e.g., associated with cache memory, hardware disk memory, data encryption, etc.) are determined for storage of specified portions of the data. In step 520, each portion the data is stored within an associated tier of the hardware storage system. In step 522, it is automatically determined that attributes of the group of combined data storage attributes require modification. In step 524, modified attributes from the group of combined data storage attributes are generated and steps 508-520 are repeated to generate and process a modified attribute matrix and digital tag for determining additional tier of the hardware storage system for storage of the portions of data.

Figure 6:
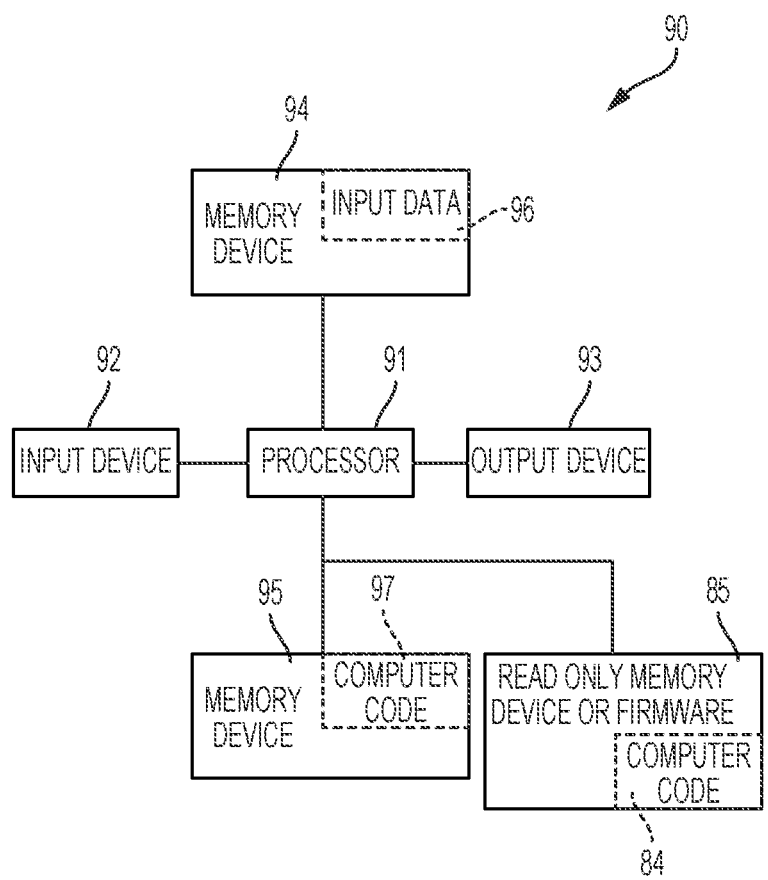
FIG. 6 illustrates a computer system used by the system of FIG. 1 for enabling a process for improving remote storage system efficiency via usage of automated storage device tiering, in accordance with embodiments of the present invention.

FIG. 6 illustrates a computer system 90 (e.g., server 23, hardware storage system 21, and controller hardware device 14 of FIG. 1) used by or comprised by the system of FIG. 1 for improving remote storage system efficiency via usage of automated storage device tiering, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for improving remote storage system efficiency via usage of automated storage device tiering. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve remote storage system efficiency via usage of automated storage device tiering. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving remote storage system efficiency via usage of automated storage device tiering. In another embodiment, the invention provides a business method that performs the process steps of the invention on a subscription, advertising, and/or fee basis. That is, a service supplier, such as a Solution Integrator, could offer to enable a process for improving remote storage system efficiency via usage of automated storage device tiering. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
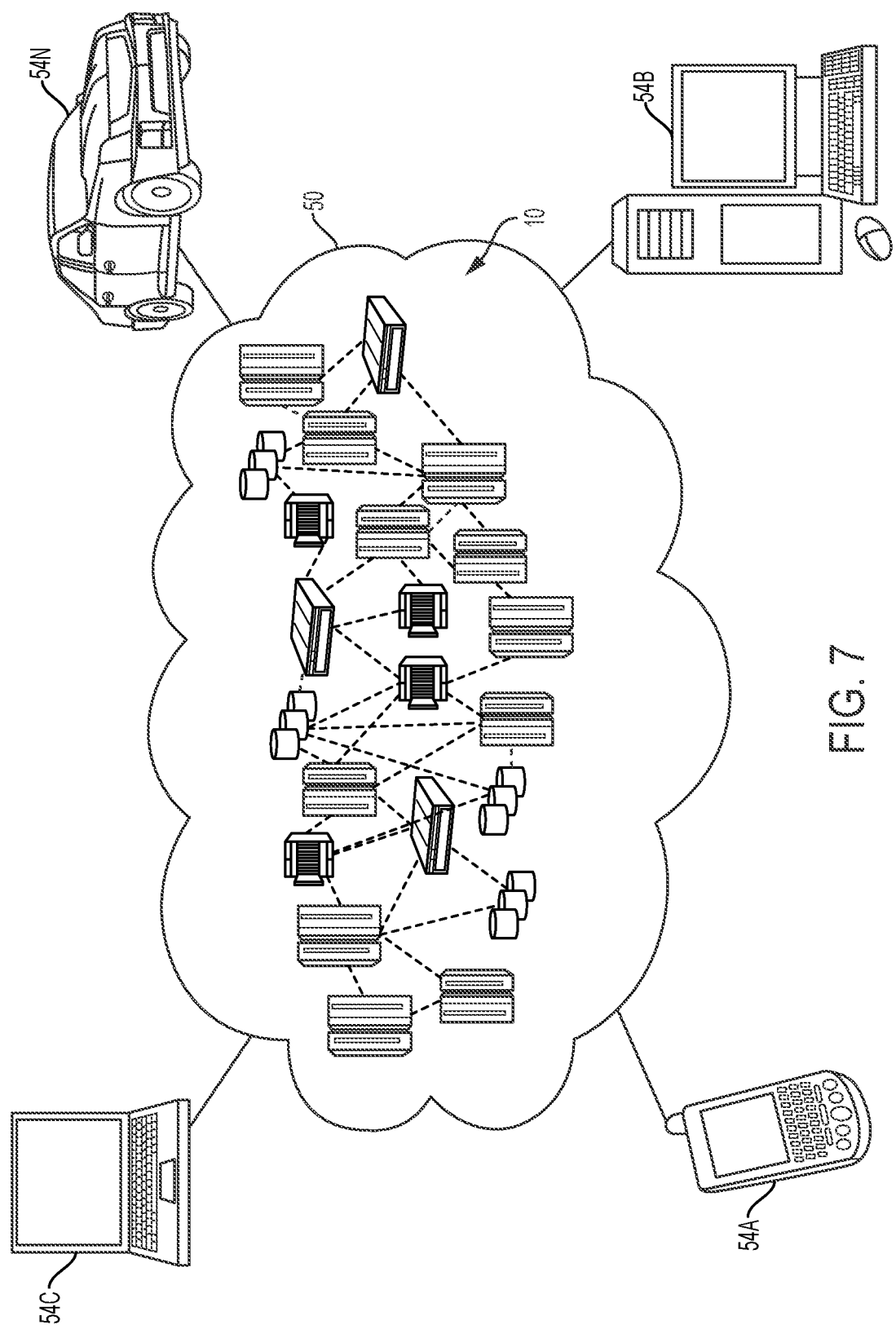
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving remote storage system efficiency via usage of automated storage device tiering.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data storage system improvement method comprising:
    extracting, by a processor of controller hardware device for a hardware storage system, original data storage attributes from metadata comprised by data for storage within said hardware storage system, wherein said hardware storage system comprises a database generated from differing volumes within a cloud;
    retrieving, by said processor, additional data storage attributes associated with current storage requirements of said data, wherein said original data storage attributes and said additional data storage attributes comprise storage system accessibility attributes, storage system data type attributes, storage system I/O type attributes, storage system archival properties attributes, and encryption property attributes;
    merging, by said processor, said original data storage attributes with said additional data storage attributes resulting in a group of combined data storage attributes;
    generating, by said processor, an attribute matrix categorizing attribute types with respect to attribute values for each attribute of said group of combined data storage attributes;
    generating, by said processor, a digital tag defining said attribute matrix, wherein said digital tag comprises an 8 bit tag comprising an attribute type section and an attribute value section;
    attaching, by said processor, said digital tag to said metadata;
    receiving, by said processor, data storage tier definitions and associated tier attributes;
    associating, by said processor, said digital tag with said data storage tier definitions and associated tier attributes;
    determining, by said processor based on results of said associating, specified tiers of said hardware storage system for storage of specified portions of said data, wherein each volume of said differing volumes is generated from differing hardware storage devices classified with said specified tiers, and wherein said differing hardware storage devices comprise disk drives, magnetic tapes, cache memory, SSD disks, SAS disks, SATA disks, and database storage devices; and
    storing, by said processor, each portion of said specified portions of said data within an associated tier of said specified tiers of said hardware storage system.

2. The method of claim 1, further comprising:
    automatically determining, by said processor, that attributes of said group of combined data storage attributes require modification;
    generating, by said processor based on said automatically determining, modified attributes from said group of combined data storage attributes;
    generating, by said processor, a modified attribute matrix categorizing modified attribute types with respect to modified attribute values for each modified attribute of said modified attributes;
    generating, by said processor, a modified digital tag defining said modified attribute matrix;
    attaching, by said processor, said modified digital tag to said metadata;
    first associating, by said processor, said modified digital tag with said data storage tier definitions and associated tier attributes;
    determining, by said processor based on results of said first associating, additional tiers of said hardware storage system for storage of said specified portions of said data; and
    storing, by said processor, each portion of said specified portions of said data within an associated tier of said additional tiers of said hardware storage system.

3. The method of claim 1, wherein said attribute types comprise types selected from the group consisting of data accessibility, data type, data input/output type, and data encryption type.

4. The method of claim 1, wherein said attribute values comprise values selected from the group consisting of data storage frequency values, data file types, buffered or direct input/outputs, and data encryption properties.

5. The method of claim 1, wherein said hardware storage system comprises a cloud data storage system.

6. The method of claim 1, wherein said specified tiers of said hardware storage system comprise tiers associated with configured cache memory.

7. The method of claim 1, wherein said specified tiers of said hardware storage system comprise tiers associated with hardware disks.

8. The method of claim 1, wherein said specified tiers of said hardware storage system comprise tiers associated with data encryption.

9. The method of claim 1, further comprising:
providing at least one support service for at least one of creating, integrating, hosting, maintaining, and deploying computer-readable code in the control hardware, said code being executed by the computer processor to implement: said extracting, said retrieving, said merging, said generating said attribute matrix, said generating said digital tag, said attaching, said receiving, said associating, said determining, and said storing.

10. A computer program product, comprising a computer readable hardware storage device storing a computer readable program code, said computer readable program code comprising an algorithm that when executed by a processor of a controller hardware device of a hardware storage system implements a data storage system improvement method, said method comprising:
extracting, by said processor, original data storage attributes from metadata comprised by data for storage within said hardware storage system, wherein said hardware storage system comprises a database generated from differing volumes within a cloud;
retrieving, by said processor, additional data storage attributes associated with current storage requirements of said data, wherein said original data storage attributes and said additional data storage attributes comprise storage system accessibility attributes, storage system data type attributes, storage system I/O type attributes, storage system archival properties attributes, and encryption property attributes;
merging, by said processor, said original data storage attributes with said additional data storage attributes resulting in a group of combined data storage attributes;
generating, by said processor, an attribute matrix categorizing attribute types with respect to attribute values for each attribute of said group of combined data storage attributes;
generating, by said processor, a digital tag defining said attribute matrix, wherein said digital tag comprises an 8 bit tag comprising an attribute type section and an attribute value section;
attaching, by said processor, said digital tag to said metadata;
receiving, by said processor, data storage tier definitions and associated tier attributes;
associating, by said processor, said digital tag with said data storage tier definitions and associated tier attributes;
determining, by said processor based on results of said associating, specified tiers of said hardware storage system for storage of specified portions of said data, wherein each volume of said differing volumes is generated from differing hardware storage devices classified with said specified tiers, and wherein said differing hardware storage devices comprise disk drives, magnetic tapes, cache memory, SSD disks, SAS disks, SATA disks, and database storage devices; and
storing, by said processor, each portion of said specified portions of said data within an associated tier of said specified tiers of said hardware storage system.

11. The computer program product of claim 10, wherein said method further comprises:
automatically determining, by said processor, that attributes of said group of combined data storage attributes require modification;
generating, by said processor based on said automatically determining, modified attributes from said group of combined data storage attributes;
generating, by said processor, a modified attribute matrix categorizing modified attribute types with respect to modified attribute values for each modified attribute of said modified attributes;
generating, by said processor, a modified digital tag defining said modified attribute matrix;
attaching, by said processor, said modified digital tag to said metadata;
first associating, by said processor, said modified digital tag with said data storage tier definitions and associated tier attributes;
determining, by said processor based on results of said first associating, additional tiers of said hardware storage system for storage of said specified portions of said data; and
storing, by said processor, each portion of said specified portions of said data within an associated tier of said additional tiers of said hardware storage system.

12. The computer program product of claim 10, wherein said attribute types comprise types selected from the group consisting of data accessibility, data type, data input/output type, and data encryption type.

13. The computer program product of claim 10, wherein said attribute values comprise values selected from the group consisting of data storage frequency values, data file types, buffered or direct input/outputs, and data encryption properties.

14. The computer program product of claim 10, wherein said hardware storage system comprises a cloud data storage system.

15. The computer program product of claim 10, wherein said specified tiers of said hardware storage system comprise tiers associated with configured cache memory.

16. A controller hardware device of hardware storage system comprising a processor coupled to a computer-readable memory unit, said memory unit comprising instructions that when executed by the computer processor implements a data storage system improvement method comprising:
extracting, by said processor, original data storage attributes from metadata comprised by data for storage within said hardware storage system, wherein said hardware storage system comprises a database generated from differing volumes within a cloud;
retrieving, by said processor, additional data storage attributes associated with current storage requirements of said data, wherein said original data storage attributes and said additional data storage attributes comprise storage system accessibility attributes, storage system data type attributes, storage system I/O type attributes, storage system archival properties attributes, and encryption property attributes;

merging, by said processor, said original data storage attributes with said additional data storage attributes resulting in a group of combined data storage attributes;

generating, by said processor, an attribute matrix categorizing attribute types with respect to attribute values for each attribute of said group of combined data storage attributes;

generating, by said processor, a digital tag defining said attribute matrix, wherein said digital tag comprises an 8 bit tag comprising an attribute type section and an attribute value section;

attaching, by said processor, said digital tag to said metadata;

receiving, by said processor, data storage tier definitions and associated tier attributes;

associating, by said processor, said digital tag with said data storage tier definitions and associated tier attributes;

determining, by said processor based on results of said associating, specified tiers of said hardware storage system for storage of specified portions of said data, wherein each volume of said differing volumes is generated from differing hardware storage devices classified with said specified tiers, and wherein said differing hardware storage devices comprise disk drives, magnetic tapes, cache memory, SSD disks, SAS disks, SATA disks, and database storage devices; and storing, by said processor, each portion of said specified portions of said data within an associated tier of said specified tiers of said hardware storage system.

* * * * *